US006376080B1

(12) United States Patent
Gallo

(10) Patent No.: US 6,376,080 B1
(45) Date of Patent: Apr. 23, 2002

(54) METHOD FOR PREPARING POLYBENZOXAZINE

(75) Inventor: Anthony A. Gallo, Olean, NY (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/327,253

(22) Filed: Jun. 7, 1999

(51) Int. Cl.[7] .................... B32B 27/38; B32B 27/28; C08G 59/16
(52) U.S. Cl. .................... 428/413; 428/704; 427/58; 427/96; 427/386; 427/385.5; 525/523; 525/533; 525/534; 528/363; 528/403; 528/405; 528/409; 528/418
(58) Field of Search .................... 528/363, 405, 528/409, 418, 403; 525/533, 534, 523; 427/58, 96, 386, 385.5; 428/413, 704

(56) References Cited

U.S. PATENT DOCUMENTS

| | | | |
|---|---|---|---|
| 2,825,728 A | 3/1958 | Rigterink | 260/244 |
| 2,904,537 A | 9/1959 | Brinker et al. | 260/78 |
| 3,510,454 A | 5/1970 | Bottenbruch et al. | 260/47 |
| 3,839,283 A | 10/1974 | Binsack | 260/47 |
| 3,996,197 A | 12/1976 | Binsack | 260/47 |
| 4,206,295 A | 6/1980 | Wagner et al. | 525/410 |
| 4,385,165 A | 5/1983 | Ahne et al. | 528/53 |
| 4,501,864 A | 2/1985 | Higginbottom | 525/484 |
| 4,507,428 A | 3/1985 | Higginbottom et al. | 524/596 |
| 4,584,352 A | 4/1986 | Beaudoin | 525/410 |
| 5,021,484 A * | 6/1991 | Schreiber et al. | 524/100 |
| 5,189,094 A | 2/1993 | Umetani et al. | 525/27 |
| 5,476,716 A | 12/1995 | Gallo | 428/413 |
| 5,543,516 A | 8/1996 | Ishida | 544/69 |
| 6,207,786 B1 * | 3/2001 | Ishida et al. | 528/94 |

FOREIGN PATENT DOCUMENTS

EP 0 659 832 A1 6/1995 .......... C08L/61/06

OTHER PUBLICATIONS

Aisawa et al., "Thermosetting Resin Compositions Showing Improved Flexiblility and Adhesion to Substrates", Chemical Abstracts 37 vol. 130, No. 5, p. 72, 1999.

Kimura et al., "Epoxy Resin Cured by Bisphenol A Based Benzoxaine", Journal of Applied Polymer Science, vol. 68, 1903–1910, 1998.

Ishida et al., "Mechanical Characterization of Copolymers Based on Benzoxazine and Epoxy", Polymer, vol. 37, No. 20, pp. 4487–4495, 1996.

Ishida et al., "Catalyzing the Curing Reaction of a New Bezoxazine–Based Phenolic Resin", Journal of Applied Polymer Science 58:1751–1760, 1995.

Ishida, "Development of Polybenzoxazines: A New Class of High Performance, Ring–Opening Phenolic Resins with Superb Balance . . . ", The NSF Center for Mol. & Microstructure of Composites (CMMC), Cleveland, OH.

Miyamoto et al., "Cationic Ring–Opening Polymerization of 4H–3,1–Benzoxazines", Kobunshi Ronbunshu 52(9):536–545, 1995.

Nagase et al., "Thermosetting Resin Composition for Semiconductor Seals and Resin—Sealed Semiconductor Devices", Chem. Abs. 130:253081y.

Riess et al., "Ring Opening Polymerization of Benzoxazines—A New Route to Phenolic Resins", Advances In Polymer Synthesis, pp. 27–49, Plenum Press, New York and London.

Suthar, "Polyanthranilides. III. Synthesis and Characterization of Polyamides from 6,6'-Bis[3,1–benzoxazin–2,4–dione]", J. Macromol. Sci. –Chem., A18(5):773–781, 1982.

Ueda et al., "Synthesis of poly(benzoxazinone)s by Direct Polycondensation of Dicarboxylic Acids with bis(anthranilic acid)s . . . ", J. Polym. Sci., Polym. Chem. Ed. 27(3):1017–1026, 1989.

* cited by examiner

*Primary Examiner*—Margaret G. Moore
(74) *Attorney, Agent, or Firm*—Webb Ziesenheim Logsdon Orkin & Hanson, P.C.

(57) ABSTRACT

The invention relates to a method of preparing a polybenzoxazine which includes heating a molding composition including a benzoxazine and a heterocyclic dicarboxylic acid to a temperature sufficient to cure the molding composition, thereby forming the polybenzoxazine. Also disclosed are a method of preparing a polybenzoxazine composition having near-zero volume change after post cure and a method of coating a device using a polybenzoxazine composition of this invention.

84 Claims, No Drawings

METHOD FOR PREPARING POLYBENZOXAZINE

This invention relates to a method of preparing a polybenzoxazine and a method of coating a device using such a polybenzoxazine.

BACKGROUND OF THE INVENTION

Electronic devices such as circuit boards, semiconductors, transistors, and diodes are often coated with materials such as epoxy resins for protection. Such coating materials are often cured on the surface of an electronic device by heat. But electronic devices often are sensitive to heat, and too much heat may adversely affect the performance of a device. Further, if the coating material shrinks or expands significantly in response to heat, the device it coats may be warped. Thus, it is desirable to develop methods for curing coating materials at relatively low temperatures in short time periods and to develop coating materials that have a near-zero volume change upon heat treatment so as to minimize the possiblities of damaging the coated devices.

SUMMARY OF THE INVENTION

In general, the invention relates to methods of preparing a polybenzoxazine (PBO) composition at relatively low temperature in short time periods. The methods can be used, for example, to provide a coating on electronic devices such as circuit boards and semiconductors. The preferred PBO compositions have high glass transition temperature, good electrical properties (e.g., dielectric constant), low flammability, and a near-zero percent shrinkage and expansion upon demolding, postcuring, and cooling.

In one aspect, the invention features a method of preparing a PBO including heating a molding composition having a benzoxazine and a heterocyclic dicarboxylic acid to a temperature sufficient to cure the molding composition, thereby forming the PBO.

In another aspect, the invention features a method of preparing a PBO including heating a molding composition having a benzoxazine and a catalyst to a temperature in the range of about 150° C. to about 250° C. to cure the molding composition in about 1 minute to about 5 minutes, thereby forming the PBO. Preferably, the method can be carried out in the range of about 160° C. to about 210° C. in about 2 minutes to about 4 minutes.

In another aspect, the invention features a method of coating a device including heating a molding composition having a benzoxazine and a heterocyclic dicarboxylic acid to a temperature sufficient to cure the molding composition, thus forming a PBO which coats a surface of the device. The device can be an electronic device such as a semiconductor or a circuit board.

In another aspect, the invention features a method of coating a device including heating a molding composition including a benzoxazine to a temperature sufficient to cure the composition, thereby forming a polymer composition. The polymer composition forms on a surface of the device, and results in essentially no warpage of the device after post curing the molding composition. The device can be a semiconductor or a circuit board.

The invention also relates to a molding composition including a benzoxazine and a heterocyclic dicarboxylic acid; a polymer composition including a polybenzoxazine and a heterocyclic dicarboxylic acid; and a device coated with a polymer composition including a polybenzoxazine and a heterocyclic dicarboxylic acid.

The invention also relates to a benzoxazine-containing molding composition that has a post cure volume change of less than 0.15%, preferably less than 0.10%, and more preferably less than 0.05%. A post cure volume change includes shrinkage or expansion and is measured according to the procedure described subsequently in the application.

The invention also relates to a benzoxazine-containing molding composition. The composition, when applied on a FR-4 board, results in essentially no warpage of the device after post cure. Warpage is measured according to the procedure described subsequently in the application.

The invention still further relates to a device coated with a polymer composition including a polybenzoxazine, an epoxy resin, and a phenolic resin.

The heterocyclic dicarboxylic acid includes an X,Y-containing heterocyclic moiety and a dicarboxylic acid moiety which is bonded to the X,Y-containing cyclic moiety. The heterocyclic dicarboxylic acid is of formula (I):

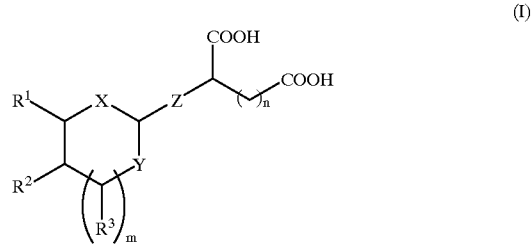

X is N, O, or $NR^a$, where $R^a$ is hydrogen, alkyl, cycloalkyl, heterocycloalkyl, aryl, heteroaryl, aralkyl, or heteroaralkyl. Preferably, X is N or O. More preferably, X is N. Y is O, S, $NR^b$, or $C(R^c)(R^d)$, where $R^b$ is hydrogen, alkyl, cycloalkyl, heterocycloalkyl, aryl, heteroaryl, aralkyl, or heteroaralkyl, and where each of $R^c$ and $R^d$, independently, is hydrogen, alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, nitro, cyano, alkylcarbonyloxy, alkyloxycarbonyl, alkylcarbonyl, formyl, aminocarbonyl, alkylcarbonylamino, alkylsulfonylamino, aminosulfonyl, aminocarbonyloxy, or alkyloxycarbonylamino. Preferably, Y is O or S. More preferably, Y is S. Z is a bond, S, O, or $NR^e$, where $R^e$ is hydrogen, alkyl, cycloalkyl, heterocyclo-alkyl, aryl, heteroaryl, aralkyl, or heteroaralkyl. Preferably, Z is a bond or S. More preferably, Z is a bond. Each of $R^1$, $R^2$, and $R^3$, independently, is hydrogen, alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. $R^1$ and $R^2$, optionally, can join together to form a cyclic moiety. Likewise, $R^2$ and $R^3$, optionally, can join together to form a cyclic moiety. The cyclic moiety formed by joining $R^1$ and $R^2$, or $R^2$ and $R^3$ is substituted or unsubstituted cycloalkyl, substituted or unsubstituted heterocycloalkyl, substituted or unsubstituted aryl, or substituted or unsubstituted heteroaryl. Preferably, $R^1$ and $R^2$ join together to form a cyclic moiety. More preferably, the cyclic moiety is aromatic. An example of such an aromatic cyclic moiety is a benzene ring. The cyclic moiety can be further substituted by groups such as alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. m is 0 or 1. Preferably, m is 0. When m is 0, $R^3$ and the carbon atom to which $R^3$ bonded are deleted, and Y is directly bonded to the carbon atom to which $R^2$ is bonded. n is 0, 1, 2, 3, 4, 5, or 6. Preferably, n is 1.

The X,Y-containing heterocyclic moiety can be saturated, unsaturated, or aromatic. In one embodiment, the X,Y-containing heterocyclic moiety can be a furan, a thiophene, a thiazole, an oxazole, an imidazole, a pyridine, a piperidine, or a pyrimidine. Preferably, the X,Y-containing heterocyclic moiety is a thiazole.

Examples of heterocyclic dicarboxylic acid of formula (I) include 2-(2-benzthiazolyl)-succinic acid and (2-benzthiazolylthio)-butanedioic acid, available from Ciba Geigy under the trade name IRGACOR 252LD and IRGACOR 252FC, respectively.

It should be noted that heterocyclic dicarboxylic acid can form an acid anhydride. Such an acid anhydride is also within the scope of this invention.

As used herein, alkyl is a straight or branched hydrocarbon chain containing 1 to 8 carbon atoms. Examples of alkyl include, but are not limited to, methyl, ethyl, propyl, isopropyl, butyl, isobutyl, sec-butyl, tert-butyl, n-pentyl, and 2-methylhexyl.

As used herein, cycloalkyl is a cyclic alkyl group containing 3 to 8 carbon atoms. Some examples of cycloalkyl are cyclopropyl, cyclopentyl, cyclohexyl, cycloheptyl, adamantyl, and norbornyl. Heterocycloalkyl is a cycloalkyl group containing 1–3 heteroatoms such as nitrogen, oxygen, or sulfur. Examples of heterocycloalkyl include piperidinyl, piperazinyl, tetrahydropyranyl, tetrahydrofuryl, and morpholinyl.

As used herein, aryl is an aromatic group containing 6–12 ring atoms and can contain fused rings, which may be saturated, unsaturated, or aromatic. Examples of an aryl group include phenyl, naphthyl, biphenyl, phenanthryl, and anthracyl. Heteroaryl is aryl containing 1–3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Amino groups can be unsubstituted, mono-substituted, or di-substituted. It can be substituted, for example, with groups such as alkyl, cycloalkyl, heterocycloalkyl, aryl, heteroaryl, aralkyl, or heteroaralkyl. Halo refers to fluoro, chloro, bromo, or iodo.

As used herein, a cyclic moiety refers to a 5- to 6-membered cycloalkyl, heterocycloalkyl, aryl, or heteroaryl moiety. A cyclic moiety can also be fused rings and can be formed from two or more of the just-mentioned groups. Each of these moieties is optionally substituted with alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl.

As used herein, a molding composition refers to a composition having a benzoxazine monomer that can form a PBO polymer composition of this invention.

As used herein, a molding composition is cured when it forms a good cull cure (i.e., strong and not brittle).

Other features and advantages of the invention will be apparent form the description of the preferred embodiments thereof, and from the claims.

DESCRIPTION OF THE PREFERRED EMBODIMENTS

The preferred method involves heating a molding composition including a benzoxazine and a heterocyclic dicarboxylic acid having formula (I) at from 150° C. to 250° C., preferably from 160° C. to 210° C., for 1 to 5 minutes, preferably for 2 to 4 minutes, to form a PBO composition. The preferred PBO composition contains a PBO and a heterocyclic acid catalyst, and optionally an epoxy resin, a phenolic resin, and a second acid catalyst.

Suitable benzoxazine monomers can be prepared by condensing two equivalents of formaldehyde with one equivalent of a primary amine (e.g., methylamine and aniline) and reacting with one equivalent of a phenol (e.g., bisphenol-A). For reference, see, e.g., Burke et al., J. Org. Chem. 30(10), 3423 (1965). A schematic representation of this reaction is reproduced below. The groups R, R', and R" are not particularly limited and can be hydrogen or other suitable substituents such as alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl.

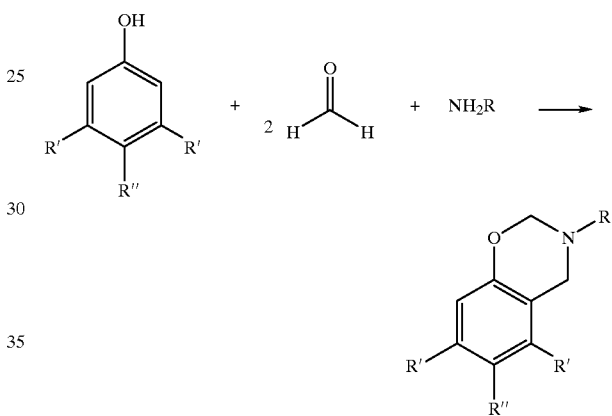

The benzoxazine monomers can then undergo a ring opening thermal polymerization reaction in the presence of a heterocyclic dicarboxylic acid catalyst of formula (I) to form a PBO as shown in the reaction below.

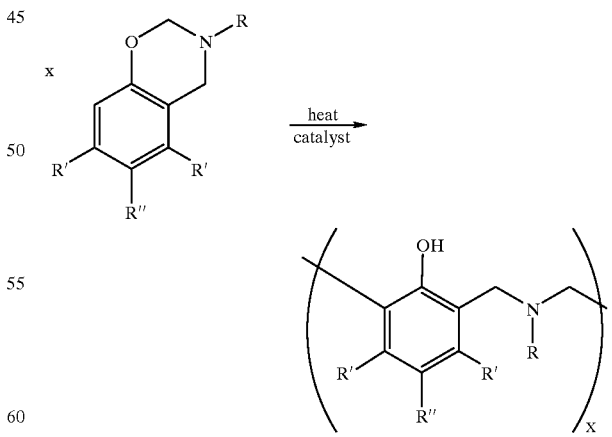

Because of the nature of the polymerizing reaction, addition of each monomer to the propagating polymer only takes place at the ortho or para position of the benzene ring. To ensure that the PBO propagates only at the ortho position of the benzene ring, the ortho position is not substituted, whereas the para position is substituted. Each of the two meta positions of the benzene ring, independently, can be substituted or unsubstituted. However, although not directly involved in the polymerization, the meta-substituents (i.e., R') can potentially affect the reaction by steric hindrance. Bi-functional benzoxazine monomers (e.g., benzoxazine monomers prepared from bisphenol-A, formaldehyde, and aniline) can also be employed in the polymerization reaction.

The preferred weight percent of the benzoxazine monomer present in the molding composition ranges from 5.0% to 20.0%, more preferably from about 10.0% to about 15.0%, based on the total weight of the composition.

The benzoxazine-containing molding compositions can be prepared by any conventional methods. For example, the ingredients (including resins and other additives) can be finely ground, dry blended, densified on a hot differential roll mill, and then followed by granulation. The molding composition, as described above, can be used for coating electronic devices such as semiconductors or circuit boards. The prepared compositions can be molded by any suitable molding apparatus. An example of such an apparatus is a transfer press equipped with a multi-cavity mold. For more detail on methods for preparing molding compositions and for coating electronic devices, see U.S. Pat. No. 5,476,716.

The heterocyclic dicarboxylic acid of formula (I) can be obtained from commercial sources or can be prepared by known methods. For example, 2-(2-benzthiazolyl)-succinic acid and (2-benzthiazolylthio)-butanedioic acid are commercially available from Ciba Geigy under the tradenames IRGACOR 252LD and IRGACOR 252FC, respectively. A general method for preparing a heterocyclic dicarboxylic acid in which Z is a bond of formula (I) is shown in the following scheme.

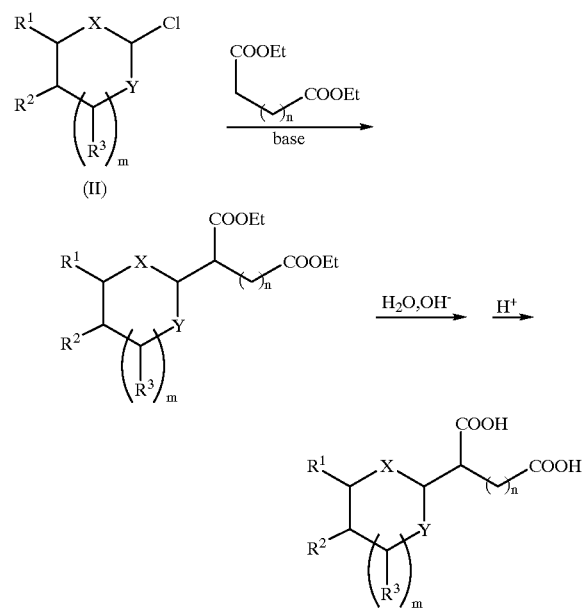

Referring to the above scheme, a protected dicarboxylic acid is first deprotonated by a base such as sodium butoxide. An example of a protecting group for the dicarboxylic acid is an ester such as ethyl ester. The deprotonated acid then reacts with a X,Y-containing heterocyclic compound having a suitable leaving group such as Cl to form a protected heterocyclic dicarboxylic acid which can then be deprotected to yield the acid catalyst of formula (I).

For compounds of formula (I) wherein Z is NH, it can be prepared by reacting a compound of formula (II) with a compound such as aspartic acid (n=2) or glutamic acid (n=3). Compounds of formula (I) wherein Z is O or S can be prepared in a similar manner.

The preferred weight percent of the heterocyclic dicarboxylic acid that can be used in catalyzing the preparation of PBO ranges from 0.3% to 5.0%, more preferably from 1.0% to 3.0%, based on the total weight of the composition.

The second acid catalyst can be a dicarboxylic acid or an acid anhydride. An example of such an acid anhydride is benzophenone tetracarboxylic acid dianhydride. The dicarboxylic acid is preferred to be an aliphatic dicarboxylic acid of the formula $HOOC-(CH_2)_p-COOH$ where p is 1–8. An example is adipic acid (i.e., p is 4). The molding composition may include, for example, 0.1 to 5.0 wt %, preferably 0.3 to 3.0 wt % of the second acid catalyst.

An example of an epoxy resin is epoxy cresol novalac. The molding composition may include, for example, about 0.5 wt % to about 7.0 wt %, preferably about 1.5 wt % to 3.5 wt %, of the epoxy resin.

An example of a phenolic resin is phenolic novalac. The molding composition may include, for example, 0.1 wt % to 3.0 wt %, preferably 0.3 wt % to 1.5 wt %, of the phenolic resin.

Below are some examples of other additives that can be included in the molding composition and the preferred ranges of their weight percent in the composition:
(1) A flame retardant such as a brominated epoxy novolac flame retardant (e.g., BREN, available from Nippon Kayaku). The preferred molding composition can contain up to 3.0 wt %, more preferably, 0.1–1.0 wt % of a flame retardant.
(2) A flame retardant synergist such as $Sb_2O_5$ or $WO_3$. The preferred molding composition can contain up to 3.0 wt %, more preferably, 0.25–1.5 wt % of a flame retardant synergist.
(3) A filler such as silica, calcium silicate, and aluminum oxide. The preferred molding composition can contain 70–90 wt %, more preferably, 75–85 wt % of a filler.
(4) A colorant such as carbon black colorant. The preferred molding composition can contain 0.1–2.0 wt %, more preferably, 0.1–1.0 wt % of a colorant.
(5) A wax or a combination of waxes such as carnauba wax, paraffin wax, S-wax, and E-wax. The preferred molding composition can contain 0.1–2.0 wt %, more preferably, 0.3–1.5 wt % of a wax.
(6) Fumed silica such as aerosil. The preferred molding composition can contain 0.3–5.0 wt %, more preferably, 0.7–3.0 wt % of fumed silica.
(7) A coupling agent such as the silane type coupling agent. The preferred molding composition can contain 0.1–2.0 wt %, more preferably, 0.3–1.0 wt % of a coupling agent.

The preferred molding compositions cure in from 1 minute to 5 minute, more preferably, from 2 minutes to 4 minutes. To determine the time for curing (i.e., minimum time needed for forming a good cull cure), the molding composition is placed in the mold press at 190° C. and is inspected after a pre-set period of time (e.g., 3 minutes). If a good cure (i.e., strong and not brittle) is formed, the experiment is repeated with a shorter period of press time until the minimum time period is determined.

The preferred molding compositions having a less than 0.15%, preferably less than 0.10%, post cure volume change includes a benzoxazine, and can further include an epoxy resin and a phenolic resin. The post cure volume change of a composition is measured according to the following steps which are based on a standard test procedure (ASTM D955-73) provided by the American Society for Testing and Materials.

(1) Prepare a single bar, single-cavity positive compression mold of inner dimensions 12.7 mm×12.7 mm×127 mm; a compression hydraulic press that delivers 1000 psi to the composition in the mold; and gages accurate to 0.02 mm for measuring the composition;
(2) fill the mold with a molding composition in such a way that there is no appreciable lateral movement of the composition during the molding process;
(3) condition the composition at 23±2° C. and 50±5% relative humidity for 24 hours;
(4) mold the composition at 190° C. and 1000 psi for 4 minutes;
(5) post cure at 175° C. for 4 more hours;
(6) allow the composition to cool to room temperature;
(7) measure the length of the composition to the nearest 0.02 mm at room temperature (i.e., 23±2° C.);
(8) calculate the % volume change by subtracting the dimension of the molded composition from the corresponding dimension of the mold cavity in which it was formed, dividing the difference by the latter, and multiplying the quotient by 100%.

Note that the test is repeated three times so that an average volume change can be obtained.

When the preferred benzoxazine-containing molding compositions is applied on a FR-4 board, essentially no warpage of the device is obverved. Warpage results as the volume of the molding composition that is on the surface of one side of the FR-4 board changes significantly upon demolding and cooling, thereby bending the coated board. To measure warpage, a FR-4 board of the dimensions 89 mm×89 mm×0.36 mm is used. A molding composition is applied and molded to one side of the FR-4 board by a transfer press to form a coating of the dimension 79.5 mm×79.5 mm×1.77 mm at 190° C. and 1000 psi for 4 minutes. The coated FR-4 board is then post cure at 175° C. for 4 more hours at the same pressure. After cooling to room temperature, the FR-4 board is placed on a flat surface with one corner being depressed. The distance between the diagonal corner of the board and the flat surface where the board is sitting is measured. An essentially zero warpage refers to a distance of no more than 2 mm. An FR-4 board is only used as an example. Other electronic devices such as BT boards (available from Herco Company, Los Angeles, Calif.) can also be coated with the preferred benzoxazine-containing molding composition without suffering from warpage.

The preferred molding compositions having a less than 0.15% volume change can include a heterocyclic dicarboxylic acid, a second dicarboxylic acid, and other additives such as fillers, colorants, flame retardants, flame retardant synergists, wax, fumed silica, and coupling agents as described above.

The preferred polymer composition may include 5.0% to 20.0%, more preferably from 10.0% to 15.0% of a PBO.

The preferred PBO's have molecular weight ranges from 200 to 3000, more preferably from 400 to 2000; a glass transition temperature ranges from 140° C. to 220° C., more preferably from 150° C. to 210° C.; a dielectric constant ranges from 3.2 to 4.0, more preferably from 3.4 to 3.5; and volume change (including shrinkage and expansion) of no more than 0.15%, preferably no more than 0.10%, and more preferably no more than 0.05%.

The following examples of PBO's were prepared and tested.

EXAMPLE 1

A sample of the bisphenol-N-aniline polybenzoxazine resin (about 400 g; obtained from Dr. Ishida, Case Western Reserve University, Cleveland, Ohio) was tested by gel permeation chromatography on a 300 mm×7.5 mm "mixed-E" type column from Polymer Labs (part no. 1110-6300) and polystyrene standards were used for calibration. The predominant peak (61% of the total resin) showed a molecular weight (Mw) of approximately 373, which corresponds to the dibenzoxazine monomer. The composition of the resin, as synthesized, is listed in Table I below.

TABLE I

| Species | Theoretical Mw | Gel Perm. Mw* | % |
|---|---|---|---|
| Dibenzoxazine monomer (bisphenol-A dibenzoxazine) | 462 | 373 | 61 |
| Monobenzoxazine dimer (di-bisphenol-A monobenzoxazine) | 690 | 562 | 10 |
| Dibenzoxazine dimer (di-bisphenol-A dibenzoxazine) | 808 | — | 0 |
| Tribenzoxazine dimer (di-bisphenol-A tribenzoxazine) | 926 | 826 | 20 |
| Tetrabenzoxizine dimer (di-bisphenol-A tetrabenzoxazine) | 1044 | — | 0 |
| Higher Mw Oligomer | — | 1807 | 9 |

*Polystyrene calibration

Small samples of the resin (about 5 g) were placed on a hot plate at 175° C. It was noticed that there was a popping sound due to rapidly escaping gas and was confirmed to be water when the percentage of moisture was later determined to be 7%. After the popping stopped, a low viscosity liquid remained. The material was left on the hot plate for about 7–10 minutes with no noticeable increase in stroke viscosity. IRGACOR 252LD (2-(2-benzthiazolyl)succinic acid) and a mixture of IRGACOR 252 and benzophenone tetracarboxylic acid dianhydride were added to the two samples of benzoxazine resin. The curing time of each sample is summarized in Table II.

TABLE II

| Catalysts | Cure Effect | Stroke Cure Time, 175° C. (min) |
|---|---|---|
| No catalyst | no cure | 10 |
| Irgacor 252LD (0.5 g) | cure to a solid | 2 |
| 1:1 mixture of Irgacor 252LD and benzophenone tetracarboxylic acid dianhydride (total wt. = 0.5 g) | solid cure | 2.5 |

EXAMPLE 2

Five PBO compositions were prepared using IRGACOR 252LD or a mixture of adipic acid and IRGACOR 252LD. The content of each composition is shown in Table III below. Also listed in this table are the required time to form a good cull cure and thermal expansion properties of each composition.

Briefly, the thermal expansion properties (alpha-1, alpha-2, and $T_g$) are determined on a thermal analyzer (TA Instrument Model 2940). The analyzer measures the expansion of the composition as a function of temperature. The expansion curve was recorded and a table of thermal expansion coefficients versus temperature were generated as a function of temperature. The Alpha-1 was calculated by measuring the change in expansion over a temperature range below the $T_g$ and the Alpha-2 was calculated over a temperature range above the $T_g$. The coefficients were measured within the temperature range of 50–250° C. $T_g$ was then determined by the intercept of two tangent lines, one drawn above and the other drawn below the transition range. The minimum time for forming a good cull cure was determined according to the procedure provided above.

TABLE III

|  | 30A | 48B | 53B | 63A | 35D |
|---|---|---|---|---|---|
| IRGACOR 252LD, % (by wt.) | 1.40 | 0.70 | 1.0 | 1.20 | 1.80 |
| Adipic Acid, % (by wt.) | — | 0.70 | 0.60 | 0.50 | — |
| Silica Filler, % | 79.54 | 81.04 | 80.39 | 80.34 | 80.04 |
| Benzoxazine (based on bisphenol-A, formaldehyde, and aniline), % | 16.67 | 14.47 | 14.27 | 14.27 | 15.27 |
| Brominated Epoxy Novolac | — | 0.50 | 0.50 | 0.50 | 0.50 |
| Fumed Silica, % | 0.60 | 0.60 | 0.60 | 0.60 | 0.60 |
| Carbon Black Colorant, % | 0.29 | 0.29 | 0.29 | 0.29 | 0.29 |
| $WO_3$, % | — | — | 0.75 | 0.75 | — |
| $Sb_2O_5$, % | — | 0.10 | — | — | 0.10 |
| Wax, % | 0.80 | 0.90 | 0.90 | 0.85 | 0.70 |
| Silane Coupling Agents | 0.70 | 0.70 | 0.70 | 0.70 | 0.70 |
| CTE, ppm/° C. |  |  |  |  |  |
| Alpha-1 | 12.6 | 11.3 | 12.6 | 12.6 | — |
| Alpha-2 | 667 | 58.3 | 71.5 | 115 | — |
| $T_g$ | 200 | 185 | 180 | 185 | — |
| Minimum time to form good cull cure, min | 3.5 | 3.25 | 2.50 | 2.50 | 2.75 |

The results show that the use of mixtures of adipic acid and IRGACOR 252LD enabled the PBO composition to have low alpha-2 values while yielding acceptable time for forming good cull cure.

EXAMPLE 3

Composition 48A and 66A were prepared from the formulations as shown in Table IV. Also shown in Table IV are their electrical properties which include volume resistivity, dielectric constant, and dissipation factor.

Composition 48A was molded at 190° C. for 4 minutes and then post cure at 175° C. for 4 more hours in an oven in the form of a disk 3" in diameter and ⅛" in thickness. After the composition was cooled to room temperature, it was cleaned and preconditioned according to ASTM D618-96, Procedure A. The thickness of the molded composition was then measured.

Composition 48A was electrified for 3 minutes at a voltage of 500±5V in accordance with the procedure ASTM D257-93 before the current was measured by using an electrometer (Keithley Model 610C). Resistivity was then calculated by the following formula:

$$P_v = (A \times V)/(t_c \times I_m)$$

where $P_v$ is the volume resistivity (Ω-cm); A is the effective area of the guarded electrode (cm$^2$); V is the applied voltage (V); $t_c$ is the average thickness of the composition (cm); and $I_m$ is the measured current (A). The procedure was repeated for composition 66A.

Capacity of composition 48A was measured according to the procedure ASTM D150-95 using a multi-frequency LCR meter (Hewlett Packard Model 4272A) at 1 KHz with 1 Volt AC at room temperature (23±2° C.). Dielectric constants and dissipation factors were calculated according to the formulas below:

$$K = 1/(1-((C/C_1) \times (t_o/t)))$$

$$D = D_o + ((t_o/t)-1) \times K \times (D_o - D_f)$$

where K is the dielectric constant; C is the capacity change when the composition was inserted in the LCR meter; $C_1$ is the capacity with the composition in the meter; $t_o$ is the parallel plate spacing; t is the average thickness of the composition; D is the dissipation factor; $D_o$ is the dissipation factor of the composition; and $D_f$ is the dissipation factor of the empty cell.

TABLE IV

|  | 48A | 66A |
|---|---|---|
| Silica Filler, % | 81.04 | 77.84 |
| Benzoxazine, % | 14.47 | 18.73 |
| Brominated Epoxy Novolac, % | 0.50 | — |
| Fumed Silica, % | 0.60 | 0.60 |
| Carbon Black Colorant | 0.29 | 0.29 |
| $Sb_2O_5$, % | 0.10 | — |
| IRGACOR 252LD, % | 1.40 | 1.40 |
| Wax, % | 0.90 | 0.44 |
| Silane Coupling Agent, % | 0.70 | 0.70 |
| (1) Volume Resistivity (ohm/cm) | $9.43 \times 10^{16}$ | $5.2 \times 10^{16}$ |
| (2) Dielectric Constant |  |  |
| 100 Hz | 3.43 | 3.41 |
| 1 kHz | 3.43 | 3.45 |
| 10 kHz | 3.41 | 3.45 |
| 100 kHz | 3.40 | 3.25 |
| (3) Dissipation Factor |  |  |
| 100 Hz | 0.0023 | 0.0022 |
| 1 kHz | 0.0037 | 0.0026 |
| 10 kHz | 0.0040 | 0.0025 |
| 100 kHz | 0.0052 | 0.0031 |

The results above show that compositions 48A and 66A have desirable electrical properties, in particular dielectric constants.

EXAMPLE 4

Composition 43D was prepared from the formulations indicated in Table V. The volume changes of composition 43D after molding and after post cure were measured according to the procedure described above which is based on the procedure ASTM D955-73 and listed in Table V below.

TABLE V

|  | 43D |
|---|---|
| Benzoxazine, wt % | 12.62 |
| Epoxy Cresol Novolac, wt % | 1.80 |
| Phenolic Novolac, wt % | 0.60 |
| BREN 304, wt % | 0.50 |

TABLE V-continued

|  | 43D |
|---|---|
| $Sb_2O_5$, wt % | 0.10 |
| Carbon Black Colorant, wt % | 0.29 |
| Wax, wt % | 0.85 |
| IRGACOR 252LD, wt % | 1.40 |
| Fumed Silica, % | 0.60 |
| Silane Coupling Agent | 0.70 |
| Filler Content, wt % | 80.54 |
| Volume change (% shrinkage) molded at 190° C. for 4 min with no post cure | −0.23% |
| Volume change (% shrinkage) molded at 190° C. for 4 min post cure at 175° C. for 4 more hours | +0.09% |

The results showed that composition 43D has a near-zero volume change (+0.09%) after post curing for 4 hours at 175° C.

EXAMPLE 5

Compositions 53A, 53B, 53C, and 53D were prepared from the formulations shown below in Table VI. These compositions were molded for 4 minutes at 190° C. and post cure for various time periods at different temperature before their thermal expansion properties (alpha-1, alpha-2, and glass transition temperature $T_g$) were measured.

TABLE VI

|  | 53A | 53B | 53C | 53D |
|---|---|---|---|---|
| Benzoxazine, wt % | 14.27 | 14.27 | 12.22 | 6.01 |
| Epoxy Cresol Novolac wt % | — | — | 2.10 | 6.76 |
| Phenolic Novolac, wt % | — | — | 0.70 | 2.25 |
| BREN 304, wt % | 0.50 | 0.50 | 0.50 | 0.50 |
| $Sb_2O_5$, wt % | 0.10 | — | — | — |
| $WO_3$, wt % | — | 0.75 | 0.75 | 0.75 |
| Wax, wt % | 0.90 | 0.90 | 0.90 | 0.80 |
| Irgacor 252LD, wt % | 1.00 | 1.00 | 1.40 | 1.40 |
| Adipic Acid, wt % | 0.60 | 0.60 | — | — |
| Fumed Silica, wt % | 0.60 | 0.60 | 0.60 | 0.60 |
| Carbon Black Colorant, wt % | 0.29 | 0.29 | 0.29 | 0.29 |
| Silane Coupling Agent, wt % | 0.70 | 0.70 | 0.70 | 0.70 |
| Filler, wt % | 81.04 | 80.39 | 79.84 | 79.94 |
| Min time to form good cull cure at 190° C. (flow mold) min | 2.75 | 2.50 | 3.50 | 3.75 |
| CTE, ppm/° C. Molded for 4 mins at 190° C. No post cure |  |  |  |  |
| Alpha-1 | 13.6 | 14.0 | 13.5 | — |
| Alpha-2 | very high | very high | 46.4 | — |
| $T_g$ | 196 | 194 | 151 | ~134 |
| Molded for 4 mins at 190° C., then post cure for 4 hrs at 175° C. |  |  |  |  |
| Alpha-1 | 11.7 | 12.6 | 12.7 | 13.1 |
| Alpha-2 | 73.1 | 71.5 | 66.0 | 45.3 |
| $T_g$ | 180 | 180 | 176 | 169 |
| Molded for 4 mins at 190° C., then post cure for 6 hrs at 175° C. |  |  |  |  |
| Alpha-1 | 12.0 | 11.9 | 13.0 | 14.1 |
| Alpha-2 | 67.9 | 69.6 | 62.5 | — |
| $T_g$ | 176 | 178 | 173 | 182 |
| Molded for 4 mins at 190° C., then post cure for 8 hrs at 175° C. |  |  |  |  |
| Alpha-1 | 11.8 | 11.9 | 13.0 | 13.4 |
| Alpha-2 | 60.4 | 63.9 | 64.0 | 47.8 |
| $T_g$ | 174 | 177 | 162 | 162 |
| Molded for 4 mins at 190° C., then post cure for 12 hrs at 175° C. |  |  |  |  |
| Alpha-1 | 11.6 | 11.6 | 12.6 | 13.1 |
| Alpha-2 | 61.0 | 55.4 | 56.0 | 47.5 |
| $T_g$ | 176 | 163 | 169 | 151 |

The results showed that post curing the compositions at 175° C. for at least 4 hours improved the properties of the compositions, for example, lowering alpha-2. However, longer post curing procedure offers no further improvement to the properties of the compositions.

EXAMPLE 6

The flammability of compositions 53A, 53B, 53C, and 53D were determined by total burn times of 1/8" bar according to the UL94 test. The test results are summarized below in Tables VII–X.

TABLE VII

| Composition | 1st Burn | 2nd Burn |
|---|---|---|
| 53A | 0 | 7 |
|  | 0 | 1 |
|  | 0 | 4 |
|  | 0 | 3 |
|  | 0 | 6 |
| Total Burn Time, seconds |  | 21 |
| UL94 status |  | V-0 |

TABLE VIII

| Composition | 1st Burn | 2nd Burn |
|---|---|---|
| 53B | 0 | 2 |
|  | 0 | 13 |
|  | 0 | 1 |
|  | 0 | 1 |
|  | 0 | 1 |
|  | 0 | 1 |
| Total Burn Time, seconds |  | 6 |
| UL94 status |  | V-1 |

TABLE IX

| Composition | 1st Burn | 2nd Burn |
|---|---|---|
| 53C | 0 | 2 |
| | 0 | >20 |
| | 0 | 7 |
| | 0 | 1 |
| | 0 | 1 |
| | 0 | 5 |
| Total Burn Time, seconds | | 16 |
| UL94 status | | V-1 |

TABLE X

| Composition | 1st Burn | 2nd Burn |
|---|---|---|
| 53D | 0 | 3 |
| | 0 | 0 |
| | 0 | 1 |
| | 0 | 9 |
| | 0 | 2 |
| Total Burn Time, seconds | | 16 |
| UL94 status | | V-1 |

The above results indicate that the introduction of a small amount of brominated resin (BREN 305) and flame retardant synergist ($Sb_2O_5$ and $WO_3$) led to an acceptable ⅛" flammability.

EXAMPLE 7

Composition 53C was coated on a FR-4 board (89 mm×89 mm×0.36 mm) and the amount of warpage of the FR-4 board was measured after molding and after post cure. The method for determining the amount of warpage has been described above.

TABLE XI

| | 53C |
|---|---|
| Volume Change, % Molded for 4 minutes at 190° C. | −0.23 |
| Observed corner rise, mm | 9.80 |
| Volume Change, % Post cure for 4 hours at 175° C. | +0.09 |
| Observed corner rise, mm | 0 |

The results showed that the FR-4 board coated with composition 53C (after post cure) was prepared without observed warpage.

Other embodiments are within the claims.

What is claimed is:
1. A method of preparing a polybenzoxazine comprising heating a molding composition including a benzoxazine and a heterocyclic dicarboxylic acid to a temperature sufficient to cure the molding composition, thereby forming the polybenzoxazine.
2. The method of claim 1, wherein the heterocyclic dicarboxylic acid includes an X,Y-containing heterocyclic moiety and a dicarboxylic acid moiety, the heterocyclic dicarboxylic acid being of formula (I):

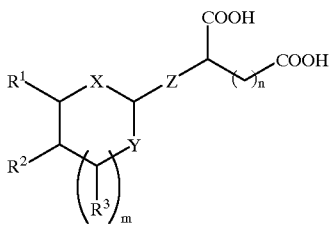

(I)

wherein
X is N, O, or $NR^a$, where $R^a$ is hydrogen, alkyl, cycloalkyl, heterocycloalkyl, aryl, heteroaryl, aralkyl, or heteroaralkyl;
Y is O, S, $NR^b$, or $C(R^c)(R^d)$, where $R^b$ is hydrogen, alkyl, cycloalkyl, heterocycloalkyl, aryl, heteroaryl, aralkyl, or heteroaralkyl; and where each of $R^c$ and $R^d$, independently, is hydrogen, alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, nitro, cyano, alkylcarbonyloxy, alkyloxycarbonyl, alkylcarbonyl, formyl, aminocarbonyl, alkylcarbonylamino, alkylsulfonylamino, aminosulfonyl, aminocarbonyloxy, or alkyloxycarbonylamino;
Z is a bond, S, O, or $NR^e$, where $R^e$ is hydrogen, alkyl, cycloalkyl, heterocyclo-alkyl, aryl, heteroaryl, aralkyl, or heteroaralkyl;
each of $R^1$, $R^2$, and $R^3$, independently, is hydrogen, alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl; $R^1$ and $R^2$, optionally, joining together to form a cyclic moiety, the cyclic moiety being substituted or unsubstituted cycloalkyl, substituted or unsubstituted heterocycloalkyl, substituted or unsubstituted aryl, or substituted or unsubstituted heteroaryl; and $R^2$ and $R^3$, optionally, joining together to form a cyclic moiety, the cyclic moiety being substituted or unsubstituted cycloalkyl, substituted or unsubstituted heterocycloalkyl, substituted or unsubstituted aryl, or substituted or unsubstituted heteroaryl;
m is 0 or 1; and
n is 0, 1, 2, 3, 4, 5, or 6;
the X,Y-containing heterocyclic moiety being saturated, unsaturated, or aromatic.
3. The method of claim 2, wherein X is N or O.
4. The method of claim 2, wherein X is N.
5. The method of claim 4, wherein Y is O or S.
6. The method of claim 4, wherein Y is S.
7. The method of claim 6, wherein Z is a bond.
8. The method of claim 7, wherein $R^1$ and $R^2$ join together to form a cyclic moiety.
9. The method of claim 8, wherein the cyclic moiety is aromatic.
10. The method of claim 9, wherein m is 0.
11. The method of claim 10, wherein n is 1.
12. The method of claim 1, wherein the heterocyclic dicarboxylic acid is a 2-(2-benzthiazolyl)-succinic acid.
13. The method of claim 2, wherein Y is O or S.

14. The method of claim 2, wherein Y is S.

15. The method of claim 2, wherein the X,Y-containing heterocyclic moiety is a furan, a thiophene, a thiazole, an oxazole, an imidazole, a pyridine, a piperidine, or a pyrimidine.

16. The method of claim 1, wherein the heterocyclic dicarboxylic acid is a thiazolyl dicarboxylic acid.

17. The method of claim 1, wherein the temperature ranges from about 150° C. to about 250° C.

18. The method of claim 1, wherein the temperature ranges from about 160° C. to about 210° C.

19. The method of claim 1, wherein the molding composition further comprises a dicarboxylic acid.

20. The method of claim 19, wherein the dicarboxylic acid is adipic acid.

21. The method of claim 1, wherein the molding composition further comprises a dicarboxylic acid anhydride.

22. The method of claim 21, wherein the dicarboxylic acid anhydride is benzophenone tetracarboxylic acid dianhydride.

23. The method of claim 1, wherein the molding composition further comprises an epoxy resin.

24. The method of claim 1, wherein the molding composition further comprises a phenolic resin.

25. A method of preparing a polybenzoxazine comprising heating a molding composition including a benzoxazine and a catalyst comprising a heterocyclic dicarboxylic acid to a temperature in the range of about 150° C. to about 250° C. to cure the molding composition in about 1 minute to about 5 minutes, thereby forming the polybenzoxazine.

26. The method of claim 25, wherein the temperature ranges from about 160° C. to about 210° C.

27. The method of claim 25, wherein the molding composition cures in about 2 minutes to about 4 minutes.

28. The method of claim 25, wherein the catalyst is a thiazolyl dicarboxylic acid.

29. The method of claim 25, wherein the catalyst further comprises a dicarboxylic acid.

30. The method of claim 29, wherein the dicarboxylic acid is adipic acid.

31. The method of claim 25, wherein the catalyst further comprises a dicarboxylic acid anhydride.

32. The method of claim 31, wherein the dicarboxylic acid anhydride is benzophenone tetracarboxylic acid anhydride.

33. A molding composition comprising a benzoxazine and a heterocyclic dicarboxylic acid.

34. The molding composition of claim 33, wherein the heterocyclic dicarboxylic acid is of the formula (I):

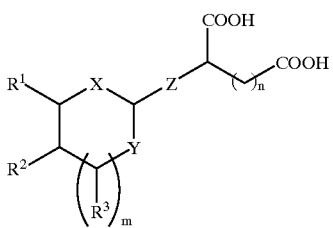

(I)

wherein
X is N, O, or NR$^a$, where R$^a$ is hydrogen, alkyl, cycloalkyl, heterocycloalkyl, aryl, heteroaryl, aralkyl, or heteroaralkyl;
Y is O, S, NR$^b$, or C(R$^c$) (R$^d$), where R$^b$ is hydrogen, alkyl, cycloalkyl, heterocycloalkyl, aryl, heteroaryl, aralkyl, or heteroaralkyl; and where each of R$^c$ and R$^d$, independently, is hydrogen, alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, nitro, cyano, alkylcarbonyloxy, alkyloxycarbonyl, alkylcarbonyl, formyl, aminocarbonyl, alkylcarbonylamino, alkylsulfonylamino, aminosulfonyl, aminocarbonyloxy, or alkyloxycarbonylamino;
Z is a bond, S, O, or NR$^e$, where R$^e$ is hydrogen, alkyl, cycloalkyl, heterocyclo-alkyl, aryl, heteroaryl, aralkyl, or heteroaralkyl;
each of R$^1$, R$^2$, and R$^3$, independently, is hydrogen, alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl; R$^1$ and R$^2$, optionally, joining together to form a cyclic moiety, the cyclic moiety being substituted or unsubstituted cycloalkyl, substituted or unsubstituted heterocycloalkyl, substituted or unsubstituted aryl, or substituted or unsubstituted heteroaryl; and R$^2$ and R$^3$, optionally, joining together to form a cyclic moiety, the cyclic moiety being substituted or unsubstituted cycloalkyl, substituted or unsubstituted heterocycloalkyl, substituted or unsubstituted aryl, or substituted or unsubstituted heteroaryl;
m is 0 or 1; and
n is 0, 1, 2, 3, 4, 5, or 6;
the X,Y-containing heterocyclic moiety being saturated, unsaturated, or aromatic.

35. The molding composition of claim 33, wherein the heterocyclic dicarboxylic acid is a thiazolyl dicarboxylic acid.

36. The molding composition of claim 33, wherein the heterocyclic dicarboxylic acid is a benzthiazolyl dicarboxylic acid.

37. The molding composition of claim 33, further comprising a dicarboxylic acid.

38. The molding composition of claim 33, further comprising a dicarboxylic acid anhydride.

39. The molding composition of claim 33, further comprising an epoxy resin.

40. The molding composition of claim 33, further comprising a phenolic resin.

41. A polymer composition comprising a polybenzoxazine and a heterocyclic dicarboxylic acid.

42. The polymer composition of claim 41, wherein the heterocyclic dicarboxylic acid is of the formula (I):

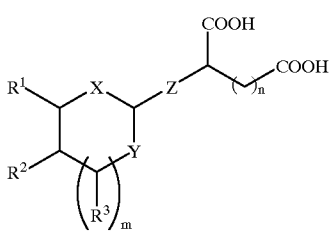

(I)

wherein
X is N, O, or NR$^a$, where R$^a$ is hydrogen, alkyl, cycloalkyl, heterocycloalkyl, aryl, heteroaryl, aralkyl, or heteroaralkyl;

Y is O, S, NR$^b$, or C(R$^c$) (R$^d$), where R$^b$ is hydrogen, alkyl, cycloalkyl, heterocycloalkyl, aryl, heteroaryl, aralkyl, or heteroaralkyl; and where each of R$^c$ and R$^d$, independently, is hydrogen, alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, nitro, cyano, alkylcarbonyloxy, alkyloxycarbonyl, alkylcarbonyl, formyl, aminocarbonyl, alkylcarbonylamino, alkylsulfonylamino, aminosulfonyl, aminocarbonyloxy, or alkyloxycarbonylamino;

Z is a bond, S, O, or NR$^e$, where R$^e$ is hydrogen, alkyl, cycloalkyl, heterocyclo-alkyl, aryl, heteroaryl, aralkyl, or heteroaralkyl;

each of R$^1$, R$^2$, and R$^3$, independently, is hydrogen, alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl; R$^1$ and R$^2$, optionally, joining together to form a cyclic moiety, the cyclic moiety being substituted or unsubstituted cycloalkyl, substituted or unsubstituted heterocycloalkyl, substituted or unsubstituted aryl, or substituted or unsubstituted heteroaryl; and R$^2$ and R$^3$, optionally, joining together to form a cyclic moiety, the cyclic moiety being substituted or unsubstituted cycloalkyl, substituted or unsubstituted heterocycloalkyl, substituted or unsubstituted aryl, or substituted or unsubstituted heteroaryl;

m is 0 or 1; and n is 0, 1, 2, 3, 4, 5, or 6;

the X,Y-containing heterocyclic moiety being saturated, unsaturated, or aromatic.

43. The polymer composition of claim 41, wherein the heterocyclic dicarboxylic acid is a thiazolyl dicarboxylic acid.

44. The polymer composition of claim 41, wherein the heterocyclic dicarboxylic acid is a benzthiazolyl dicarboxylic acid.

45. The polymer composition of claim 41, further comprising a dicarboxylic acid.

46. The polymer composition of claim 41, further comprising a dicarboxylic acid anhydride.

47. The polymer composition of claim 41, further comprising an epoxy resin.

48. The polymer composition of claim 42, wherein the amount of epoxy resin ranges from about 0.5% to about 7.0% of the total weight of the polymer composition.

49. The polymer composition of claim 47, further comprising a phenolic resin.

50. The polymer composition of claim 49, wherein the amount of phenolic resin ranges from about 0.1% to about 3.0% of the total weight of the polymer composition.

51. A method of coating a device comprising heating a molding composition including a benzoxazine and a heterocyclic dicarboxylic acid to a temperature sufficient to cure the molding composition, thereby forming a polybenzoxazine, the polybenzoxazine being on a surface of the device.

52. The method of claim 51, wherein the temperature ranges from about 150° C. to about 250° C.

53. The method of claim 51, wherein the temperature ranges from about 160° C. to about 210° C.

54. The method of claim 51, wherein the molding composition further comprises a dicarboxylic acid.

55. The method of claim 51, wherein the molding composition further comprises a dicarboxylic acid anhydride.

56. The method of claim 51, wherein the molding composition further comprises an epoxy resin.

57. The method of claim 56, wherein the amount of epoxy resin ranges from about 0.5% to about 7.0% of the total weight of the polymer composition.

58. The method of claim 56, wherein the molding composition further comprises a phenolic resin.

59. The method of claim 58, wherein the amount of phenolic resin ranges from about 0.1% to about 3.0% of the total weight of the polymer composition.

60. The method of claim 51, wherein the device is a circuit board or semiconductor.

61. A device coated with a polymer composition comprising a polybenzoxazine and a heterocyclic dicarboxylic acid.

62. The device of claim 61, wherein the heterocyclic dicarboxylic acid is of the formula (I):

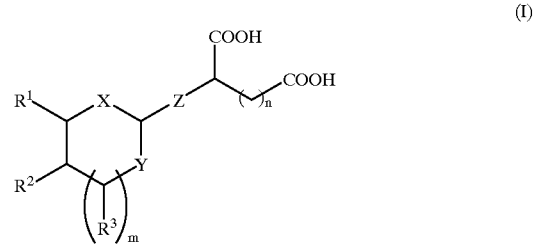

(I)

wherein

X is N, O, or NR$^a$, where R$^a$ is hydrogen, alkyl, cycloalkyl, heterocycloalkyl, aryl, heteroaryl, aralkyl, or heteroaralkyl;

Y is O, S, NR$^b$, or C(R$^c$) (R$^d$), where R$^b$ is hydrogen, alkyl, cycloalkyl, heterocycloalkyl, aryl, heteroaryl, aralkyl, or heteroaralkyl; and where each of Rc and Rd, independently, is hydrogen, alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, nitro, cyano, alkylcarbonyloxy, alkyloxycarbonyl, alkylcarbonyl, formyl, aminocarbonyl, alkylcarbonylamino, alkylsulfonylamino, aminosulfonyl, aminocarbonyloxy, or alkyloxycarbonylamino;

Z is a bond, S, O, or NR$^e$, where R$^e$ is hydrogen, alkyl, cycloalkyl, heteroalkyl, cyclo-alkyl, aryl, heteroaryl, aralkyl, or heteroaralkyl;

each of R$^1$, R$^2$, and R$^3$, independently, is hydrogen, alkyl, cycloalkyl, heterocycloalkyl, aryl, heteroaryl, aralkyl, heteroaralkyl, alkoxy, hydroxyl, hydroxylalkyl, carboxyl, halo, haloalkyl, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl; R$^1$ and R$^2$, optionally, joining together to form a cyclic moiety, the cyclic moiety being substituted or unsubstituted cycloalkyl, substituted or unsubstituted heterocycloalkyl, substituted or unsubstituted aryl, or substituted or unsubstituted heteroaryl; and R$^2$ and R$^3$, optionally, joining together to form a cyclic moiety, the cyclic moiety being substituted or unsubstituted cycloalkyl, substituted or unsubstituted heterocycloalkyl, substituted or unsubstituted aryl, or substituted or unsubstituted heteroaryl;

m is 0 or 1; and n is 0, 1, 2, 3, 4, 5, or 6;

the X,Y-containing heterocyclic moiety being saturated, unsaturated, or aromatic.

63. The device of claim 61, wherein the heterocyclic dicarboxylic acid is a thiazolyl dicarboxylic acid.

64. The device of claim 61, wherein the heterocyclic dicarboxylic acid is a benzthiazolyl dicarboxylic acid.

65. The device of claim 61, wherein the polymer composition further comprises a dicarboxylic acid.

66. The device of claim 61, wherein the polymer composition further comprises a dicarboxylic acid anhydride.

67. The device of claim 61, wherein the polymer composition further comprises an epoxy resin.

68. The device of claim 67, wherein the amount of epoxy resin ranges from about 0.5% to about 7.0% of the total weight of the polymer composition.

69. The device of claim 67, wherein the polymer composition further comprises a phenolic resin.

70. The device of claim 69, wherein the amount of phenolic resin ranges from about 0.1% to about 3.0% of the total weight of the polymer composition.

71. The device of claim 61, the device being a circuit board or semiconductor.

72. A molding composition comprising a benzoxazine, the molding composition having a post cure volume change of less 0.15%, representing the change in volume of the molded composition as compared to the molding composition in an uncured state.

73. The molding composition of claim 72, the molding composition having a post cure volume change of less than 0.10%.

74. The molding composition of claim 72, further comprising an epoxy resin.

75. The molding composition of claim 74, further comprising a phenolic resin.

76. The molding composition of claim 75, wherein the benzoxazine ranges from 5.0% to 20.0%, the epoxy resin ranges from 0.5% to 7.0%, and the phenolic resin ranges from 0.1% to 3.0% of the total weight of the molding composition.

77. A molding composition comprising a benzoxazine, the molding composition, when applied on a FR-4 board to form a device, resulting in essentially no warpage of the device after a post curing procedure.

78. The molding composition of claim 77, further comprising an epoxy resin.

79. The molding composition of claim 78, further comprising a phenolic resin.

80. The molding composition of claim 79, wherein the benzoxazine ranges from 5.0% to 20.0%, the epoxy resin ranges from 0.5% to 7.0%, and the phenolic resin ranges from 0.1% to 3.0% of the total weight of the molding composition.

81. A method of coating a device comprising heating a molding composition including a benzoxazine to a temperature sufficient to cure the composition, thereby forming a polymer composition, the polymer composition being on a surface of the device, and the device has essentially no warpage upon post curing the molding composition applied thereon.

82. The method of claim 81, wherein the device is a circuit board or a semiconductor.

83. The method of claim 81, wherein the temperature ranges from about 150° C. to about 250° C.

84. The method of claim 81, wherein the temperature ranges from about 160° C. to about 210° C.

* * * * *

UNITED STATES PATENT AND TRADEMARK OFFICE
CERTIFICATE OF CORRECTION

PATENT NO.   : 6,376,080 B1  
DATED        : April 23, 2002  
INVENTOR(S)  : Anthony A. Gallo It is certified that error appears in the above-identified patent and that said Letters Patent is hereby corrected as shown below:

Column 3,  
Line 61, "form" should read -- from --.

Column 7,  
Line 8, "gages" should read -- gauges --.

Column 13,  
Line 24, Table X, Last Column Second To Last Row "16" should read -- 15 --.  
Line 25, Table X, Last Column Last Row "V-1" should read -- V-0 --.

Column 17,  
Line 48, "claim 42" should read -- claim 47 --.

Column 18,  
Line 38, "Rc and Rd" should read -- $R^c$ and $R^d$ --.  
Line 49, "heteroalkyl, cyclo-alkyl" should read -- heterocyclo-alkyl --.

Column 19,  
Line 27, after "less" insert -- than --.

Signed and Sealed this

Twelfth Day of August, 2003

JAMES E. ROGAN  
*Director of the United States Patent and Trademark Office*